(12) United States Patent
Shargots (10) Patent No.: US 11,056,249 B2
(45) Date of Patent: Jul. 6, 2021

(54) COMBINED MOUNTING/ELECTRICAL DISTRIBUTION PLATE FOR POWERING INTERNAL CONTROL ROD DRIVE MECHANISM (CRDM) UNITS OF A NUCLEAR REACTOR

(71) Applicant: BWXT mPower, Inc., Charlotte, NC (US)

(72) Inventor: Scott J. Shargots, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 262 days.

(21) Appl. No.: 16/153,289

(22) Filed: Oct. 5, 2018

(65) Prior Publication Data

US 2019/0066855 A1 Feb. 28, 2019

Related U.S. Application Data

(62) Division of application No. 13/832,443, filed on Mar. 15, 2013, now Pat. No. 10,102,932.

(Continued)

(51) Int. Cl.
*G21C 7/12* (2006.01)
*G21C 7/14* (2006.01)
(Continued)

(52) U.S. Cl.
CPC ............... *G21C 7/12* (2013.01); *G21C 1/32* (2013.01); *G21C 7/08* (2013.01); *G21C 7/14* (2013.01);
(Continued)

(58) Field of Classification Search
CPC . G21C 1/32; G21C 1/322; G21C 7/12; G21C 7/14; G21C 7/16
See application file for complete search history.

(56) References Cited

U.S. PATENT DOCUMENTS 3,015,616 A 1/1962 Stuartz et al.
3,212,978 A 10/1965 Short et al.
(Continued)

FOREIGN PATENT DOCUMENTS

CN 1515011 A 7/2004
EP 2820653 A1 1/2015
(Continued)

OTHER PUBLICATIONS

Extended European Search Report dated Nov. 18, 2015 for European Application No. 13794357.7.
(Continued)

*Primary Examiner* — Sharon M Davis
(74) *Attorney, Agent, or Firm* — Nelson Mullins Riley & Scarborough LLP (57) ABSTRACT

An apparatus having a nuclear reactor comprising a pressure vessel containing primary coolant water and further containing a nuclear reactor core comprising fissile material, a mounting/electrical distribution plate secured entirely within the pressure vessel and configured to be submerged in the primary coolant, a set of control rod drive mechanism (CRDM) units mounted directly on the mounting/electrical distribution plate, and a plurality of cable modules mounted in receptacles of the mounting/electrical distribution plate wherein each cable module includes mineral insulated (MI) cables connected with one or more of the CRDM units, the cable module including its MI cables being removable as a unit from the receptacle of the mounting/electrical distribution plate.

15 Claims, 9 Drawing Sheets

Related U.S. Application Data (60) Provisional application No. 61/625,200, filed on Apr. 17, 2012.

(51) Int. Cl.

| | | |
|---|---|---|
| *G21C 7/16* | (2006.01) | |
| *G21C 1/32* | (2006.01) | |
| *G21C 7/08* | (2006.01) | |
| *G21C 7/36* | (2006.01) | |
| *G21C 13/00* | (2006.01) | |
| *G21C 15/243* | (2006.01) | |
| *G21C 17/116* | (2006.01) | |
| *G21C 1/08* | (2006.01) | |

(52) U.S. Cl.
CPC ............... *G21C 7/16* (2013.01); *G21C 7/36* (2013.01); *G21C 13/00* (2013.01); *G21C 15/243* (2013.01); *G21C 17/116* (2013.01); *G21C 1/086* (2013.01); *Y02E 30/30* (2013.01)

(56) References Cited

U.S. PATENT DOCUMENTS

| | | |
|---|---|---|
| 3,379,619 A | 4/1968 | Andrews et al. |
| 3,527,670 A | 9/1970 | Winders |
| 3,607,629 A | 9/1971 | Frisch et al. |
| 3,650,895 A | 3/1972 | Sodergard |
| 3,734,825 A | 5/1973 | Schabert et al. |
| 3,853,699 A | 12/1974 | Frisch et al. |
| 3,853,702 A | 12/1974 | Bevilacqua et al. |
| 3,857,599 A | 12/1974 | Jones et al. |
| 3,959,072 A | 5/1976 | Dupen |
| 4,057,467 A | 11/1977 | Kostrzewa |
| 4,072,563 A | 2/1978 | McDonald et al. |
| 4,124,442 A | 11/1978 | Zhuchkov et al. |
| 4,175,004 A | 11/1979 | Jabsen |
| 4,187,145 A | 2/1980 | Noyes et al. |
| 4,219,386 A | 8/1980 | Osborne et al. |
| 4,231,843 A | 11/1980 | Myron et al. |
| 4,235,674 A | 11/1980 | Yue |
| 4,252,613 A | 2/1981 | Jabsen |
| 4,313,797 A | 2/1982 | Attix |
| 4,420,456 A | 12/1983 | Nickel et al. |
| 4,472,348 A | 9/1984 | Desfontaines |
| 4,484,093 A | 11/1984 | Smith |
| 4,562,038 A | 12/1985 | Assedo et al. |
| 4,569,705 A | 2/1986 | Allan |
| 4,598,738 A | 7/1986 | Weber et al. |
| 4,618,471 A | 10/1986 | Defaucheux et al. |
| 4,640,811 A | 2/1987 | Peletan |
| 4,663,576 A | 5/1987 | Scarola et al. |
| 4,678,623 A | 7/1987 | Malandra et al. |
| 4,681,728 A | 7/1987 | Veronesi et al. |
| 4,683,106 A | 7/1987 | Jahnke |
| 4,687,628 A | 8/1987 | Gillett et al. |
| 4,759,904 A | 7/1988 | Gillett et al. |
| 4,762,669 A | 8/1988 | Doshi |
| 4,857,264 A | 8/1989 | Veronesi et al. |
| 4,857,265 A | 8/1989 | Pol et al. |
| 4,863,678 A | 9/1989 | Shockling et al. |
| 4,876,061 A | 10/1989 | Ekeroth et al. |
| 4,888,151 A | 12/1989 | Gjertsen et al. |
| 4,902,468 A | 2/1990 | Veronesi et al. |
| 4,963,318 A | 10/1990 | Johansson et al. |
| 4,975,239 A | 12/1990 | O'Neil et al. |
| 4,983,351 A | 1/1991 | Tower et al. |
| 4,986,954 A | 1/1991 | Feurgard |
| 4,993,864 A | 2/1991 | Gjertsen et al. |
| 5,006,305 A | 4/1991 | Denizou |
| 5,024,808 A | 6/1991 | Land et al. |
| 5,025,834 A | 6/1991 | Stoll |
| 5,064,607 A | 11/1991 | Miller et al. |
| 5,141,711 A | 8/1992 | Gjertsen et al. |
| 5,183,628 A | 2/1993 | Baujat et al. |
| 5,200,138 A | 4/1993 | Ferrari |
| 5,207,978 A | 5/1993 | Barbe |
| 5,227,125 A | 7/1993 | Beneck et al. |
| 5,237,595 A | 8/1993 | Woodcock |
| 5,241,570 A | 8/1993 | Challberg |
| 5,276,719 A | 1/1994 | Batheja et al. |
| 5,328,667 A | 7/1994 | Johnson |
| 5,361,279 A | 11/1994 | Kobsa et al. |
| 5,386,440 A | 1/1995 | Kashiwai et al. |
| 5,606,582 A | 2/1997 | Bergamaschi |
| 5,625,657 A | 4/1997 | Gallacher |
| 5,715,288 A | 2/1998 | Matteson |
| 5,841,824 A | 11/1998 | Graham |
| 5,844,958 A | 12/1998 | Leroux et al. |
| 5,930,321 A | 7/1999 | Harkness et al. |
| 6,091,790 A | 7/2000 | Ridolfo |
| 6,097,779 A | 8/2000 | Challberg et al. |
| 6,130,927 A | 10/2000 | Kang et al. |
| 6,167,104 A | 12/2000 | Garzarolli et al. |
| 6,236,699 B1 | 5/2001 | Ridolfo |
| 6,275,557 B2 | 8/2001 | Nylund et al. |
| 6,421,405 B1 | 7/2002 | Ridolfo |
| 6,477,219 B2 | 11/2002 | Hirukawa et al. |
| 6,489,623 B1 | 12/2002 | Peters et al. |
| 6,636,578 B1 | 10/2003 | Clark |
| 6,636,580 B2 | 10/2003 | Murakami et al. |
| 6,819,733 B2 | 11/2004 | Broders et al. |
| 6,865,242 B2 | 3/2005 | Barbe et al. |
| 7,085,340 B2 | 8/2006 | Goldenfield et al. |
| 7,257,185 B1 | 8/2007 | Yamada et al. |
| 7,289,590 B2 | 10/2007 | Joly et al. |
| 7,412,021 B2 | 8/2008 | Fetterman et al. |
| 7,453,972 B2 | 11/2008 | Hellandbrand, Jr. et al. |
| 7,561,654 B2 | 7/2009 | Makovicka et al. |
| 7,668,280 B2 | 2/2010 | Hellandbrand, Jr. et al. |
| 7,668,284 B2 | 2/2010 | Sparrow et al. |
| 7,672,418 B2 | 3/2010 | Aktas et al. |
| 8,102,961 B2 | 1/2012 | Aktas et al. |
| 10,102,932 B2 | 10/2018 | Shargots |
| 2006/0207672 A1 | 9/2006 | Henriksson et al. |
| 2006/0222140 A1 | 10/2006 | Aleshin et al. |
| 2008/0145174 A1 | 6/2008 | Suzuki et al. |
| 2008/0253496 A1 | 10/2008 | McCarty et al. |
| 2008/0253497 A1 | 10/2008 | Singleton et al. |
| 2009/0060114 A1 | 3/2009 | Defilippis |
| 2009/0122946 A1 | 5/2009 | Fawcett et al. |
| 2010/0150294 A1 | 6/2010 | Weisel et al. |
| 2010/0316177 A1 | 12/2010 | Stambaugh et al. |
| 2010/0316181 A1 | 12/2010 | Thome et al. |
| 2011/0222640 A1 | 9/2011 | Desantis |
| 2012/0014493 A1 | 1/2012 | Frank et al. |
| 2012/0051482 A1 | 3/2012 | Shargots et al. |
| 2012/0069947 A1 | 3/2012 | Ketcham et al. |
| 2012/0076254 A1 | 3/2012 | Malloy et al. |
| 2012/0099691 A1 | 4/2012 | Shargots et al. |

FOREIGN PATENT DOCUMENTS

| | | |
|---|---|---|
| EP | 2839475 A4 | 12/2015 |
| GB | 2058551 A | 4/1981 |
| JP | S62-44686 A | 2/1987 |
| JP | H01147396 A | 6/1989 |
| JP | 2001008336 A | 1/2001 |
| TW | 255969 B | 9/1995 |
| TW | 200845042 A | 11/2008 |
| WO | 2013176791 A1 | 11/2013 |

OTHER PUBLICATIONS

International Search Report and Written Opinion for PCT/US2013/035907 dated Oct. 29, 2013.

Office Action dated Mar. 18, 2016 for Chinese Application No. 201380031497.7.

Office Action dated Nov. 4, 2016 for European Application No. 13794357.7.

COMBINED MOUNTING/ELECTRICAL DISTRIBUTION PLATE FOR POWERING INTERNAL CONTROL ROD DRIVE MECHANISM (CRDM) UNITS OF A NUCLEAR REACTOR

CLAIM OF PRIORITY

This application is a divisional of U.S. patent application Ser. No. 13/832,443, filed Mar. 15, 2013, now U.S. Pat. No. 10,102,932, which claims the benefit of U.S. Provisional Patent Application No. 61/625,200, filed Apr. 17, 2012, which applications are hereby incorporated by reference in their entireties.

BACKGROUND

The following relates to the nuclear reactor arts, nuclear power generation arts, nuclear reactor control arts, nuclear reactor electrical power distribution arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated, rises through the central riser, discharges from the top of the central riser, and reverses direction to flow downward back toward the reactor core through a downcomer annulus.

The nuclear reactor core is built up from multiple fuel assemblies. Each fuel assembly includes a number of fuel rods. Control rods comprising neutron absorbing material are inserted into and lifted out of the reactor core to control core reactivity. The control rods are supported and guided through control rod guide tubes inside the reactor core and by guide tube frames outside the core. In the integral PWR design, at least one steam generator is located inside the pressure vessel (i.e. "integral with" the reactor), typically in the downcomer annulus, and the pressurizer is located at the top of the pressure vessel, with a steam space as the top most point of the reactor. Alternatively an external pressurizer can be used to control reactor pressure.

A set of control rods is arranged as a control rod assembly that includes the control rods connected at their upper ends with a yoke or spider, and a connecting rod extending upward from the spider. The control rod assembly is raised or lowered to move the control rods out of or into the reactor core using a control rod drive mechanism (CRDM). In a typical CRDM configuration, an electrically driven motor or magnetic assembly selectively rotates a roller nut assembly or other threaded element that engages a lead screw that in turn connects with the connecting rod of the control rod assembly. The control rods are typically also configured to "SCRAM", by which it is meant that the control rods can be quickly released in an emergency so as to fall into the reactor core under force of gravity and quickly terminate the power-generating nuclear chain reaction. Toward this end, the roller nut assembly may be configured to be separable so as to release the control rod assembly and lead screw which then fall toward the core as a translating unit. In another configuration, the connection of the lead screw with the connecting rod is latched and SCRAM is performed by releasing the latch so that the control rod assembly falls toward the core while the lead screw remains engaged with the roller nut. See Stambaugh et al., "Control Rod Drive Mechanism for Nuclear Reactor", U.S. Pub. No. 2010/0316177 A1 published Dec. 16, 2010 which is incorporated herein by reference in its entirety; and DeSantis, "Control Rod Drive Mechanism for Nuclear Reactor", U.S. Pub. No. 2011/0222640 A1 published Sep. 15, 2011 which is incorporated herein by reference in its entirety.

The CRDMs are complex precision devices which typically include an electric motor requiring electrical power, and may also require hydraulic, pneumatic, or another source of power to overcome the passive SCRAM release mechanism (e.g., to hold the separable roller nut in the engaged position, or to maintain latching of the connecting rod latch) unless this is also electrically operated (e.g., an electromagnetic clamp that releases upon removal of electrical power). In existing commercial nuclear power reactors, the CRDMs are located externally, i.e. outside of the pressure vessel, typically above the vessel in PWR designs, or below the reactor in boiling water reactor (BWR) designs. An external CRDM has the advantage of accessibility for maintenance and can be powered through external electrical and hydraulic connectors. However, the requisite mechanical penetrations into the pressure vessel present safety concerns. Additionally, in compact integral PWR designs, especially those employing an integral pressurizer, it may be difficult to configure the reactor design to allow for overhead external placement of the CRDMs. Accordingly, internal CRDM designs have been developed. See U.S. Pub. No. 2010/0316177 A1 and U.S. Pub. No. 2011/0222640 A1 which are both incorporated herein by reference in their entireties.

However, a difficulty with this approach is that it entails extensive electrical (and possibly hydraulic and/or pneumatic) cabling inside the reactor pressure vessel. For example, if there are sixty nine CRDM units with three electrical cables per CRDM unit (e.g., power, position indicator, and ground), then 207 electrical cables are required for the sixty nine units. The locations of the CRDM units are substantially constrained, e.g. all CRDM units are above the reactor core in the case of a PWR, and at a distance from the core effective to allow the CRDM units to move the control rod assemblies into or out of the core. An approach for relaxing the positioning constraint is to stagger neighboring CRDM units vertically, as disclosed in U.S. Pub. No. 2011/0222640 A1. However, the space for the electrical cabling is still tight. Electrical cabling in a nuclear reactor is typically in the form of mineral insulated (MI) cables, which have limited bend radius specifications. Cabling operations such as splicing or joining cables is complex for MI cables, because the mineral insulation can be damaged by water exposure. The SCRAM function is safety-related, and so nuclear safety regulations may require shutdown of the reactor if even one CRDM unit becomes non-operative, making reliability of this extensive MI cabling of especial importance.

Disclosed herein are improvements that provide various benefits that will become apparent to the skilled artisan upon reading the following.

BRIEF SUMMARY

In one illustrative embodiment, a nuclear reactor comprises a pressure vessel containing primary coolant water and further containing: a nuclear reactor core comprising fissile material; a mounting plate; a set of electric devices mounted on the mounting plate wherein the set of electric devices is one of (1) a set of control rod drive mechanism (CRDM) units and (2) a set of reactor coolant pumps (RCPs); a distribution plate; and a plurality of cable modules mounted in receptacles of the distribution plate. Each cable module includes mineral insulated (MI) cables connected with one or more of the electric devices, the cable module including its MI cables being removable as a unit from the receptacle of the distribution plate.

In another illustrative embodiment, a nuclear reactor comprises a pressure vessel containing primary coolant water and further containing: a nuclear reactor core comprising fissile material; a mounting plate; a distribution plate mounted on the mounting plate; and a set of electric devices mounted on the distribution plate. The distribution plate includes mineral insulated (MI) cables disposed in or on the distribution plate and connected with the set of electric devices. The set of electric devices is one of (1) a set of control rod drive mechanism (CRDM) units and (2) a set of reactor coolant pumps (RCPs). The distribution plate is incapable of supporting the weight of the set of electric devices, the distribution plate transferring weight of the set of electric devices to the mounting plate which supports the combined weight of both the set of electric devices and the distribution plate. The distribution plate in some embodiments comprises a plate having a plurality of grooves, and cable modules disposed in the grooves of the plate, each cable module including a portion of the MI cables disposed on or in the distribution plate, each cable module including its portion of the MI cables being removable from the plate as a unit.

In another illustrative embodiment, an electrical distribution plate comprises a plate having a plurality of receptacles, and cable modules disposed in the receptacles of the plate. Each cable module includes mineral insulated (MI) cables, and each cable module including its MI cables is removable from the plate as a unit. Each cable module when mounted in its receptacle of the plate defines a conduit or raceway through which its MI cables run. In some embodiments, each cable module includes electrical connectors that are externally accessible when the cable module is mounted in its receptacle of the plate.

In another illustrative embodiment, a nuclear reactor comprises: a pressure vessel; a nuclear reactor core comprising fissile material disposed in the pressure vessel; an electrical distribution plate as set forth in the immediately preceding paragraph disposed in the pressure vessel; and a set of electrical devices electrically connected with the MI cables of the cable modules of the electrical distribution plate. In some embodiments the set of electrical devices is a set of control rod drive mechanism (CRDM) units.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
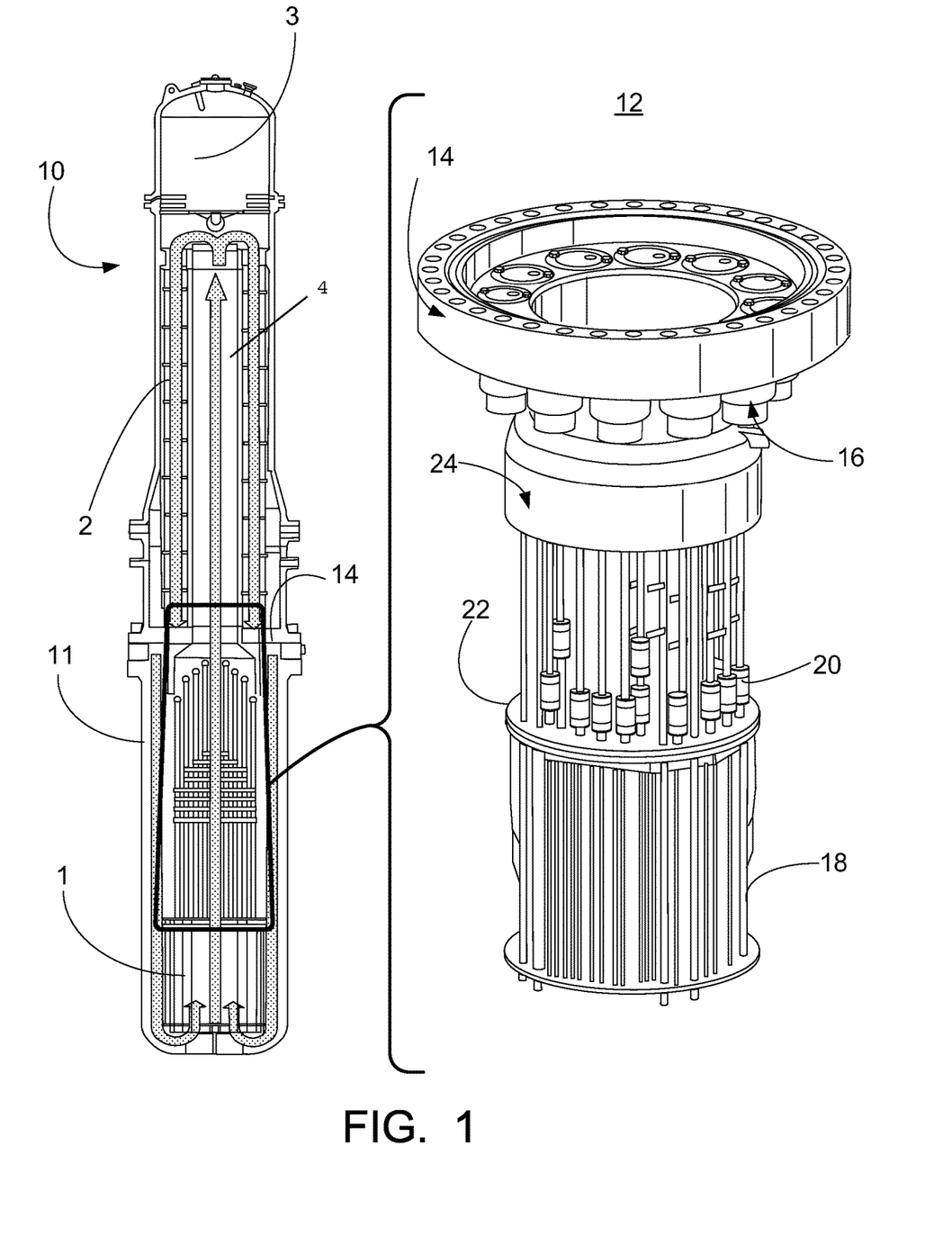
FIG. 1 diagrammatically shows an integral pressurized water reactor (integral PWR) with the upper internals of the reactor inset.

FIG. 1 illustrates an integral pressurized water reactor (integral PWR) generally designated by the numeral 10. A reactor vessel 11 is generally cylindrical and contains primary coolant water, a reactor core 1, one or more steam generators 2, and a pressurizer 3. A central riser 4 separates a hot leg of the primary coolant circuit flowing upward through the central riser 4 from a cold leg of the primary coolant circuit flowing downward through a downcomer annulus defined between the central riser 4 and the pressure vessel 11. The one or more steam generators are suitably disposed in the downcomer annulus. Although a pressurized water reactor (PWR) is depicted, a boiling water reactor (BWR) or other type of nuclear reactor is also contemplated. The reactor 10 is an illustrative example, and numerous variants are contemplated, such as replacing the pressurizer 3 with an external pressurizer, employing external steam generators, and so forth. Moreover, while the disclosed rapid installation and servicing techniques are described with reference to illustrative internal CRDM units, these techniques are readily adapted for use with other internal nuclear reactor components such as internal reactor coolant pumps.

In the illustrative PWR, above the core 1 are the reactor upper internals 12 of integral PWR 10, shown in inset. In the illustrative PWR 10, the upper internals 12 are supported laterally by a mid-flange 14, which in the illustrative embodiment also supports internal canned reactor coolant pumps (RCPs) 16. More generally, the RCPs may be external pumps or have other configurations (or, RCPs may be omitted entirely and the reactor may rely upon natural circulation of primary coolant), and the upper internals may be supported otherwise than by the illustrative mid flange 14. The upper internals include control rod guide frames 18 to guide the control rod assemblies for controlling the nuclear chain reaction in the core 1. Control rod drive mechanisms (CRDMs) 20 raise and lower the control rods to control the reactor. In accordance with one embodiment, a CRDM distribution plate 22 supports the CRDMs and provides power and/or hydraulics to the CRDMs. The CRDM distribution plate may be combined with or include separate "mid-hanger plate." A riser transition 24 connects the lower end of the central riser 4 with a core shroud or the like to separate the hot and cold legs of the primary coolant circuit in the lower vessel region.

Control rods are withdrawn from the core 1 by the CRDMs 20 to provide enough positive reactivity to achieve criticality. Control rod guide tubes passing through the reactor core 1 and the guide frames 18 above the core provide space for the rods and interconnecting spider to be raised upward away from the reactor core. The CRDMs 20 include electric motors which move the rods via a suitable mechanism such as a nut/screw mechanism, rack-and-pinion mechanism, or so forth. In illustrative examples, a nut-screw mechanism is assumed. For any motor driven mechanism, electrical cables are needed to power the motor, and electric cables may also be needed for auxiliary electrical components such as rod position indicators and/or rod bottom sensors. In some designs, the force to latch the connecting rod to the lead screw, or to maintain engagement of the separable roller nut, is hydraulic, necessitating a hydraulic connection to the CRDM. Alternatively, electric mechanisms can be employed for these purposes, thus calling for additional electric cabling. To ensure passive safety, a positive force is usually required to prevent SCRAM, such that removal of the positive force initiates a SCRAM. The illustrative CRDM 20 is an internal CRDM, that is, is located inside the reactor vessel, and so the electrical connections to the CRDMs 20 are difficult to access. The distribution plate 22 provides a structural support for this electrical cabling. Servicing of a CRDM during a plant shutdown should preferably be rapid in order to minimize the length of the shutdown. To facilitate replacing a CRDM, the CRDM assembly (possibly including a standoff) is connected to the distribution plate 22 to provide electrical power and hydraulics to the CRDM 20 via connectors that require no action to effectuate the connection other than placement of the standoff assembly onto the distribution plate 22. After placement, the CRDM assembly is secured to the distribution plate by bolts or other fasteners. Additionally or alternatively, it is contemplated to rely upon the weight of the CRDM to hold the assembly in place, or to use welds to secure the assembly.

Figure 2:
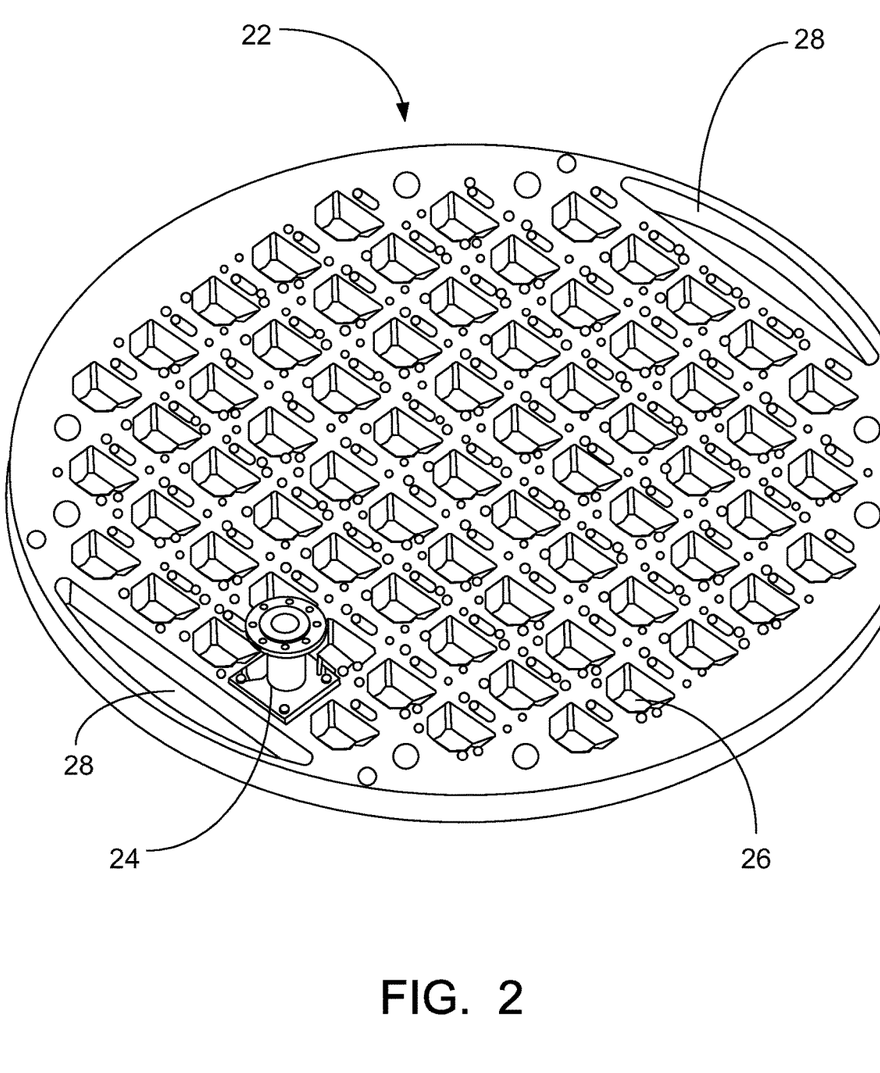
FIG. 2 shows a perspective view of a distribution plate suitably used in the upper internals of the integral PWR of FIG. 1.

FIG. 2 illustrates one embodiment of a distribution plate 22 which is a single plate that contains the electrical and hydraulic lines and also is strong enough to provide support to the CRDMs and upper internals without reinforcement. The motor/roller nut assembly of the CRDM is generally located in the middle of the lead screw's travel path. When the control rod is fully inserted into the core, the roller nut is holding the top of the lead screw, and, when the control rod is at the top of the core, the roller nut is holding the bottom of the lead screw and most of the length of the lead screw extends upward above the motor/roller nut assembly. Hence the distribution plate 22 that supports the CRDM is positioned "below" the CRDM units and a relatively short distance above the reactor core.

FIG. 2 shows the distribution plate 22 with a single standoff assembly 24 mounted for illustration, though it should be understood that all openings 26 would have a standoff assembly (and accompanying CRDM) mounted in place during operation of the reactor. Each opening 26 allows a lead screw of a control rod to pass through and the periphery of the opening provides a connection site for a standoff assembly that supports the CRDM. The lead screw passes down through the CRDM, through the standoff assembly, and then through the opening 26. The distribution plate 22 has, either internally embedded within the plate or mounted to it, electrical power lines (e.g., electrical conductors) and hydraulic power lines (if needed) to supply the CRDM with power and hydraulics. The illustrative openings 26 are asymmetric or keyed so that the CRDM can only be mounted in one orientation. As illustrated, there are 69 openings arranged in nine rows to form a grid, but more or fewer could be used depending on the number of connecting rod/CRDM units in the reactor. The distribution plate 22 is circular to fit the interior of the reactor, with openings 28 to allow for flow through the plate. Flow may also be designed through the CRDMs 20, i.e. through the flow passages 26 around or through components of the CRDMs 20. In some designs, not all openings 26 may have CRDMs mounted to them.

Each internal control rod drive mechanism (CRDM) unit 20 is powered by electrical power and/or hydraulic power. In the design of FIG. 1, the CRDM units are packed closely together, which creates a high density of electrical and/or hydraulic cabling. The distribution plate 22 facilitates efficient deployment of this extensive cabling. However, it is recognized herein that such rapid deployment preferably should be augmented by an efficient mechanism for repair or replacement of the MI cabling and/or hydraulic cabling. Although MI cabling is robust, which is why it is typically selected for use in a nuclear reactor environment, it is still susceptible to damage due to the challenging reactor environment that exposes the cabling to high temperature, high pressure and pressure cycling, radioactivity, and possibly caustic chemicals (e.g., soluble boron-based chemical shim). In the event of a failure of a cable of the distribution plate 22, the failed component would need to be accessed and repaired in-place (which is difficult due to the special handling required for MI cables in order to avoid degradation due to water exposure) or the entire distribution plate 22 would need to be removed (which would involve removal of all 69 CRDM units 20 in the case of the illustrative embodiment of FIGS. 1 and 2).

Figure 3:
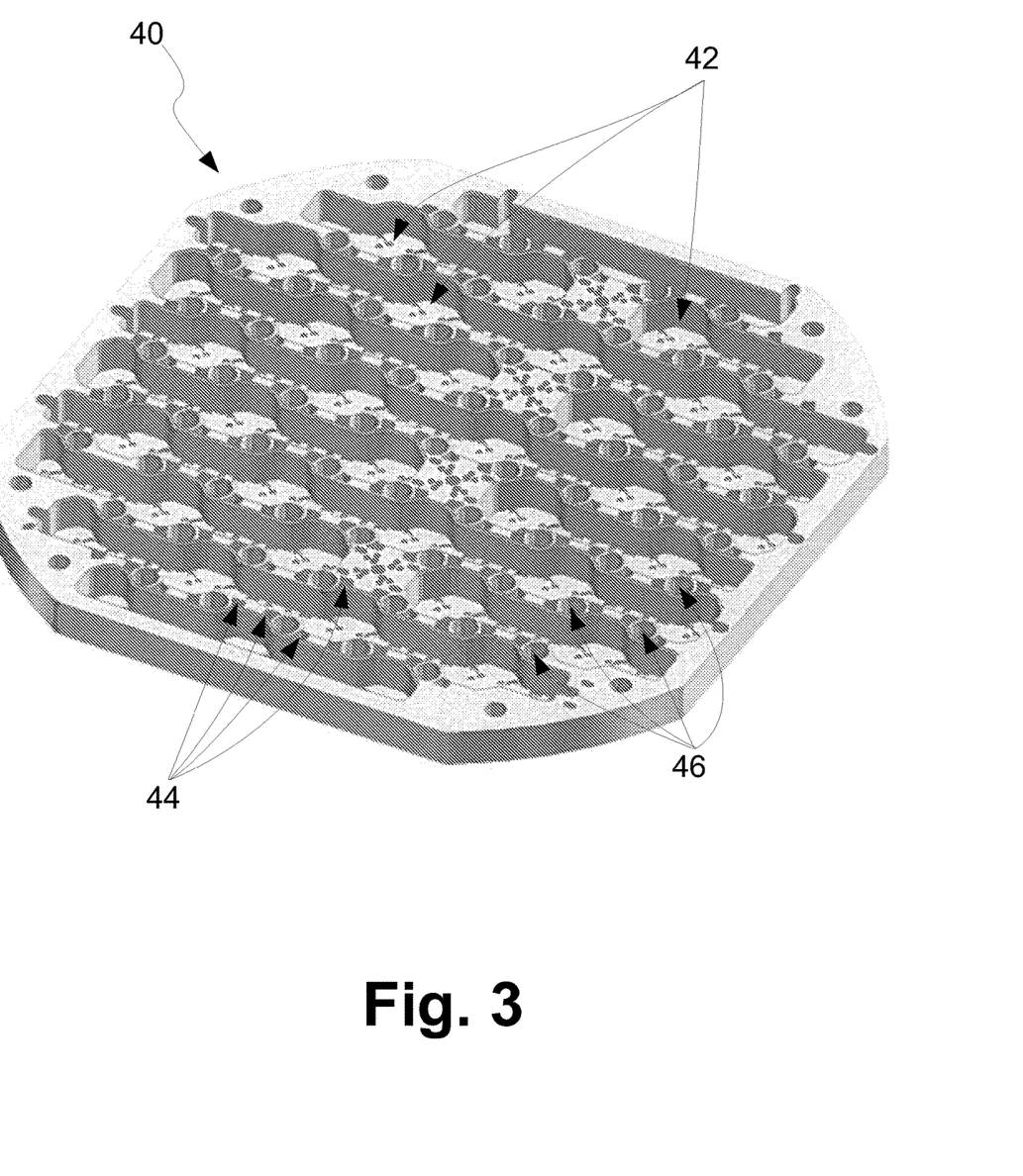
FIG. 3 diagrammatically shows an alternative embodiment of a distribution plate having openings for modules.
Figure 4:
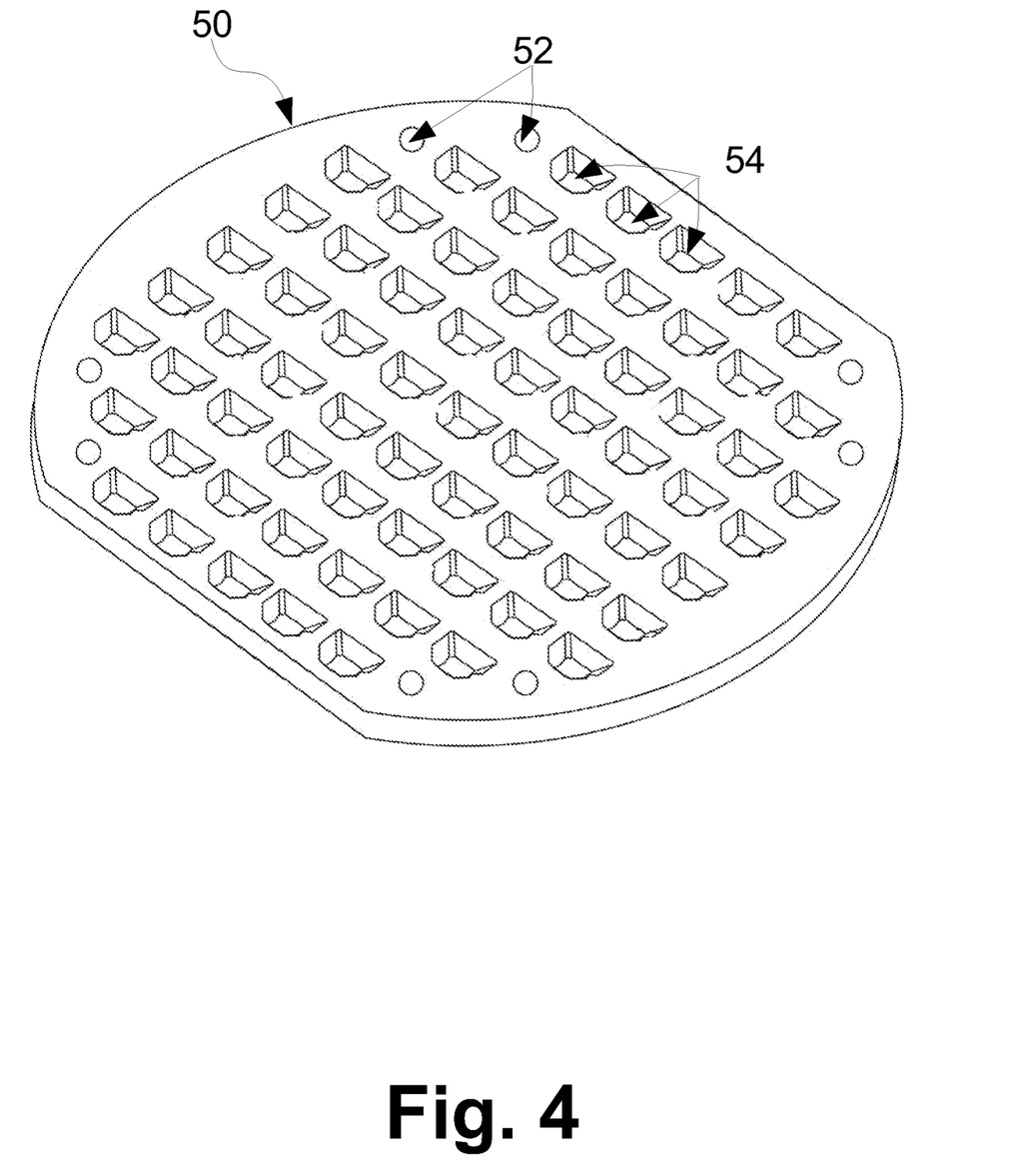
FIG. 4 diagrammatically shows a support plate for use with the distribution plate of FIG. 3.

With reference to FIGS. 3-11, an improved distribution plate design is disclosed, which is constructed as a multi-component assembly. A power distribution plate (PDP) 40 shown in FIG. 3 provides the structural frame for power distribution to the CRDMs 20. The illustrative embodiment is a two-plate design in which the PDP 40 sits on top of a support plate, for example a mid-hanger plate 50 shown in FIG. 4) and transfers the weight of the CRDMs 20 to the support plate 50. In this two-plate design, the PDP 40 of FIG. 3 is not strong enough to support the weight of the CRDMs and instead transfers the load to the support plate 50 shown in FIG. 4, which carries the weight of both the CRDMs 20 and the PDP 40 and its installed cable modules (see FIGS. 7-10). The two-plate design advantageously facilitates fabrication of the PDP 40 with its relatively intricate features using machining. In one embodiment, the PDP 40 is machined from plate stock or a forging of 304L, although other materials and/or manufacturing methods are contemplated.

In a variant two-plate design (not shown), the power distribution plate is contemplated to be mounted underneath the support plate, in which case the power distribution plate would not perform a load transfer function respective to the CRDMs. As yet another contemplated variant, in a single-plate design (not shown) the PDP also provides structural support for the CRDMs, in which case the PDP would be a substantially thicker plate, formed for example by casting and/or forging.

The PDP 40 of FIG. 3 is shown without installed cable modules, so as to show receptacles 42 into which the power cable modules 60 (FIGS. 7 and 8) and sensor cable modules 70 (FIGS. 9 and 10, e.g. cables for sensors such as position indicators and rod bottom, i.e. PI, indicators) are inserted. The receptacles 42 are generally formed as grooves so that the cable modules 60, 70 of relatively narrow aspect-ratio can deliver cabling to the interior of the PDP 40. The cable modules 60, 70 route the electrical cables. Hydraulic lines 78 are mounted to the PDP 40 (see FIG. 11), although it is alternatively contemplated to include the hydraulic lines in the modules as well.

Figure 5:
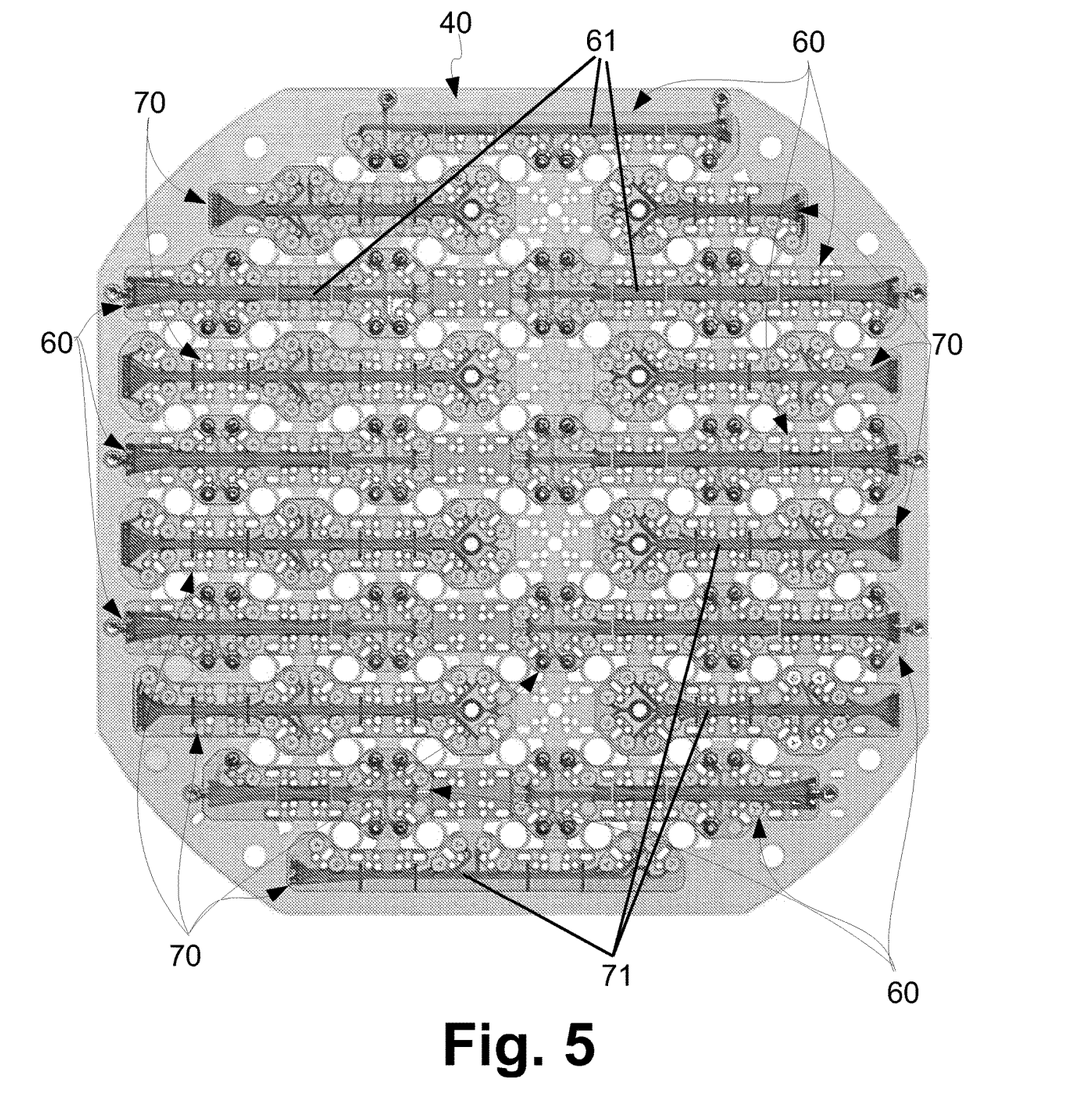
FIG. 5 illustrates an overhead view of the distribution plate of FIG. 3 with modules installed.
Figure 6:
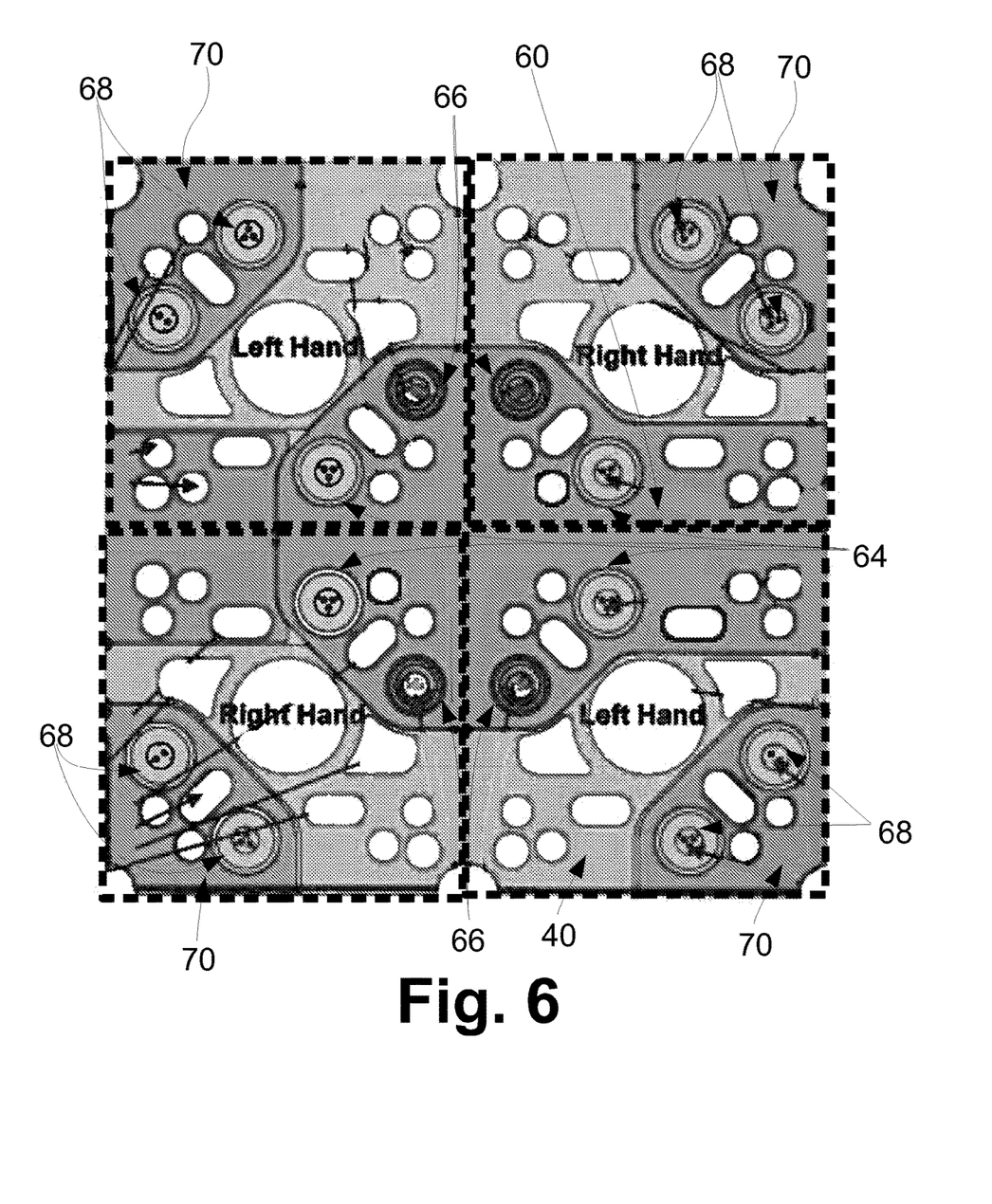
FIG. 6 illustrates an enlarged view of a portion of the plate with modules installed of FIG. 5, with the footprints of four installed CRDM standoffs indicated by dotted lines.

FIG. 5 shows the PDP 40 with the cable modules 60, 70 installed, while FIG. 6 shows an enlarged portion of the PDP 40 with the cable modules 60, 70 installed, and with the footprints of four CRDM standoffs indicated by four dashed squares. In FIG. 5, power MI cables 61 of the power cable modules 60 and signal MI cables 71 of the signal cable modules 70 are diagrammatically shown. (Note that FIG. 5 is diagrammatic in that it shows the MI cables 61, 71 which are actually mostly or completely occluded by the tops of the installed modules 60, 70; compare with FIGS. 7-10). The MI cables of each module run from a pigtail, input connector, or other electrical input located (when the module is installed on the PDP 40) at the periphery of the PDP 40 and run to connectors arranged to connect with the CRDMs 20. External power input cables run from electrical feedthroughs of the pressure vessel 11 to the pigtails or other peripheral electrical inputs of the cable module 60, 70.

As seen in FIG. 6, the CRDMs 20 are mounted overlapping the cable modules, receiving power, hydraulics, and providing signal cable connections via the cable modules 60, 70. It will be noted that the power cable modules 60 and the sensor cable modules 70 alternate across the PDP 40, and each CRDM standoff is arranged to overlap a portion of one power cable module 60 and a portion of one sensor cable module 70 (see FIG. 6) in order to connect with both power lines and signal lines. With reference back to FIG. 3, the PDP 40 has an opening (four of which are labeled 46 in FIG. 3) for each CRDM, which allows the lead screw, connecting rod, or other connecting element to pass through to the control rods (or to the spider or yoke holding the control rods). In the illustrative embodiment shown, there are 69 such openings for the 69 CRDMs 20. These openings 46 of the PDP 40 are aligned with openings 54 through the support plate 50 to allow the lead screw, connecting rod, or other connecting element to pass through both the PDP 40 (via openings 46) and the support plate 50 (via openings 54). Attachment points 52 (see FIG. 4) connect the mid-hanger support plate 50 to the upper internals 12. The PDP 40 of FIG. 3 also has flow slots (four of which are labeled 44) to reduce head loss due to the PDP (that is, to reduce pressure drop over the PDP 40). Aligned flow holes may be provided in the support plate 50 as well, but are not shown.

Figure 7:
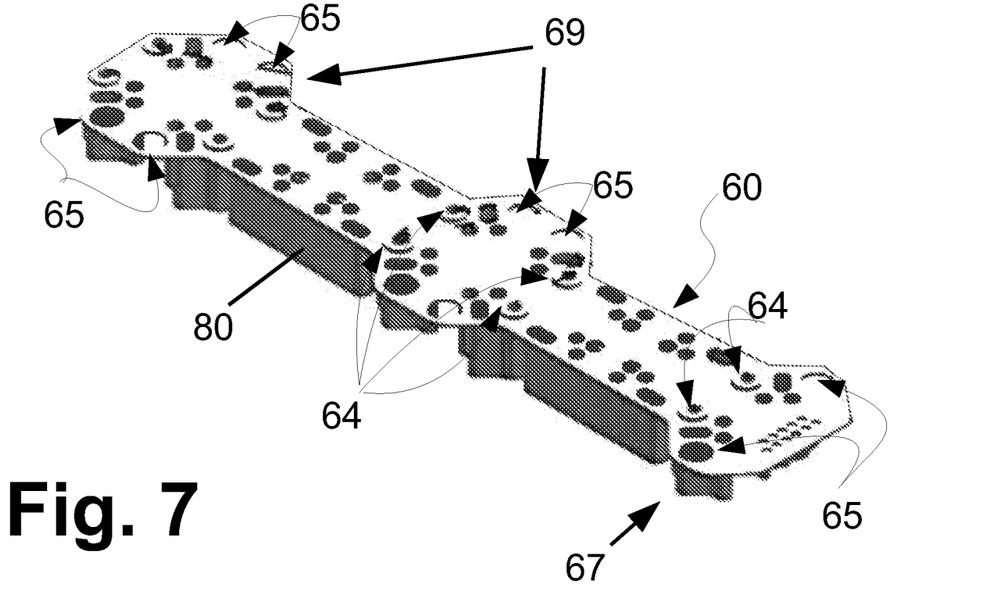
FIGS. 7 and 8 illustrate two alternative perspective views of an electrical and hydraulic module for use with the distribution plate of FIG. 3.
Figure 8:
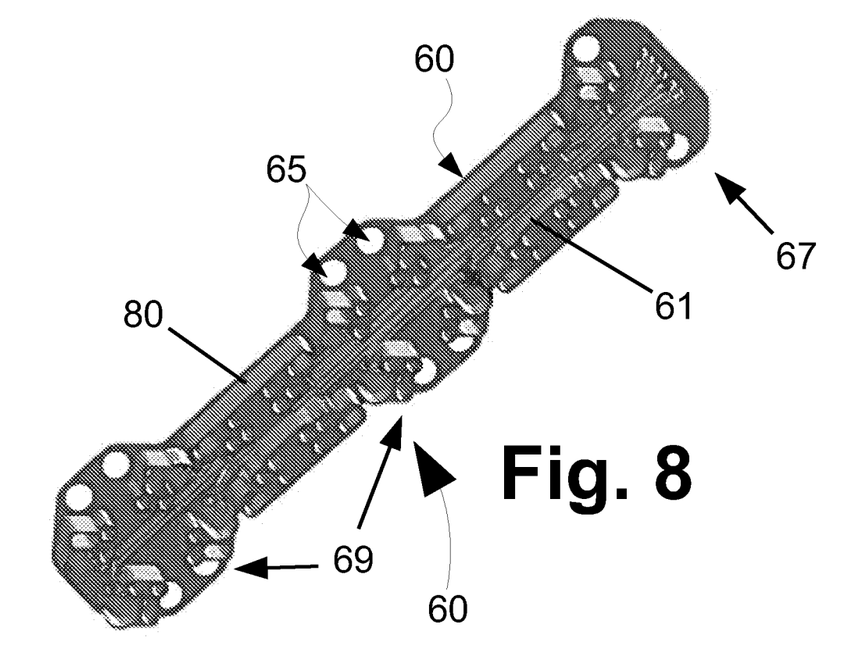

With continuing reference to FIG. 6 and with further reference to FIGS. 7 and 8, the MI cables 61 of the power cable module 60 run from the peripheral pigtail, input connector, or other electrical input at an input station 67 to one or more connection blocks 69 of the cable module 60. At each connection block 69, one or (typically) more of the MI cables terminate at electric power connections 64 that feed one of the CRDM units. The illustrative power cable module 60 has two connection blocks 69 and six MI cables 61: three of the cables terminate at the connection block 69 that is more proximate to the input station 67, while the remaining three MI cables continue on and terminate at the connection block 69 that is more distal from the input station 67. Other configurations are possible—for example, the uppermost and lowermost power cable modules 60 of the distribution plate of FIG. 5 has a different configuration since those power cable modules are roughly parallel with the periphery of the PDP 40: those power cable blocks have two outer stations with both inputs and CRDM outputs and a middle station that has only CRDM outputs.

Figure 9:
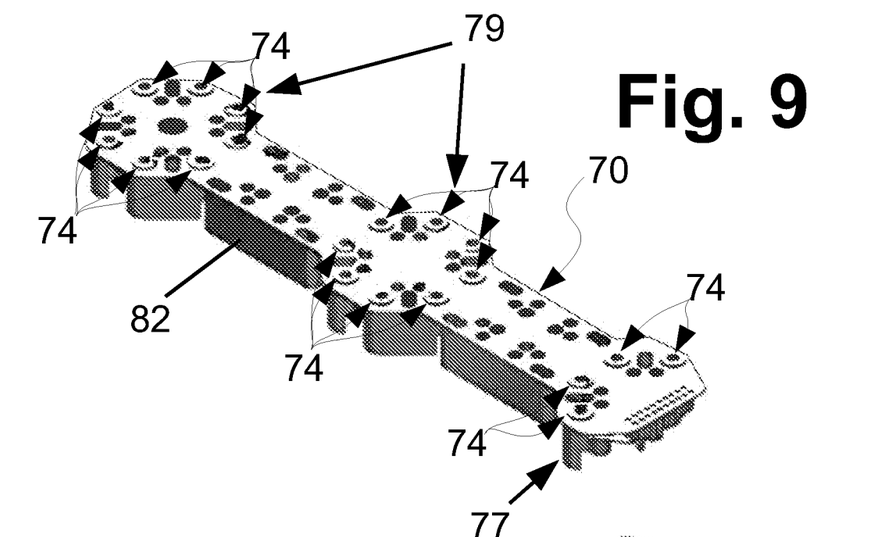
FIGS. 9 and 10 illustrate two alternative perspective views of a rod position indication and rod bottom module for use with the distribution plate of FIG. 3.
Figure 10:
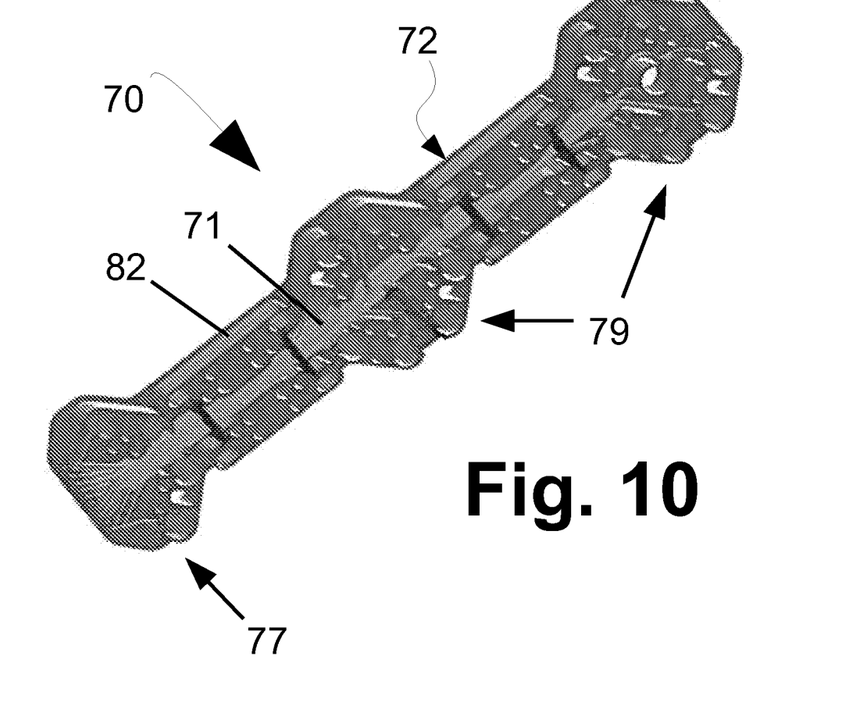

With continuing reference to FIG. 6 and with further reference to FIGS. 9 and 10, a signal cable module 70 is shown having a similar configuration to the power module 60 of FIGS. 7 and 8. The signal cable module 70 of FIGS. 9 and 10 again includes an end input block 77 and two connection blocks 79, one in the middle and the other at the opposite end from the input block. As with the power cable modules, various configurations are possible for the signal cable modules: for example, in the distribution plate of FIG. 5 the upper rightmost signal cable module 70 has only an input block and a single connection block.

Figure 11:
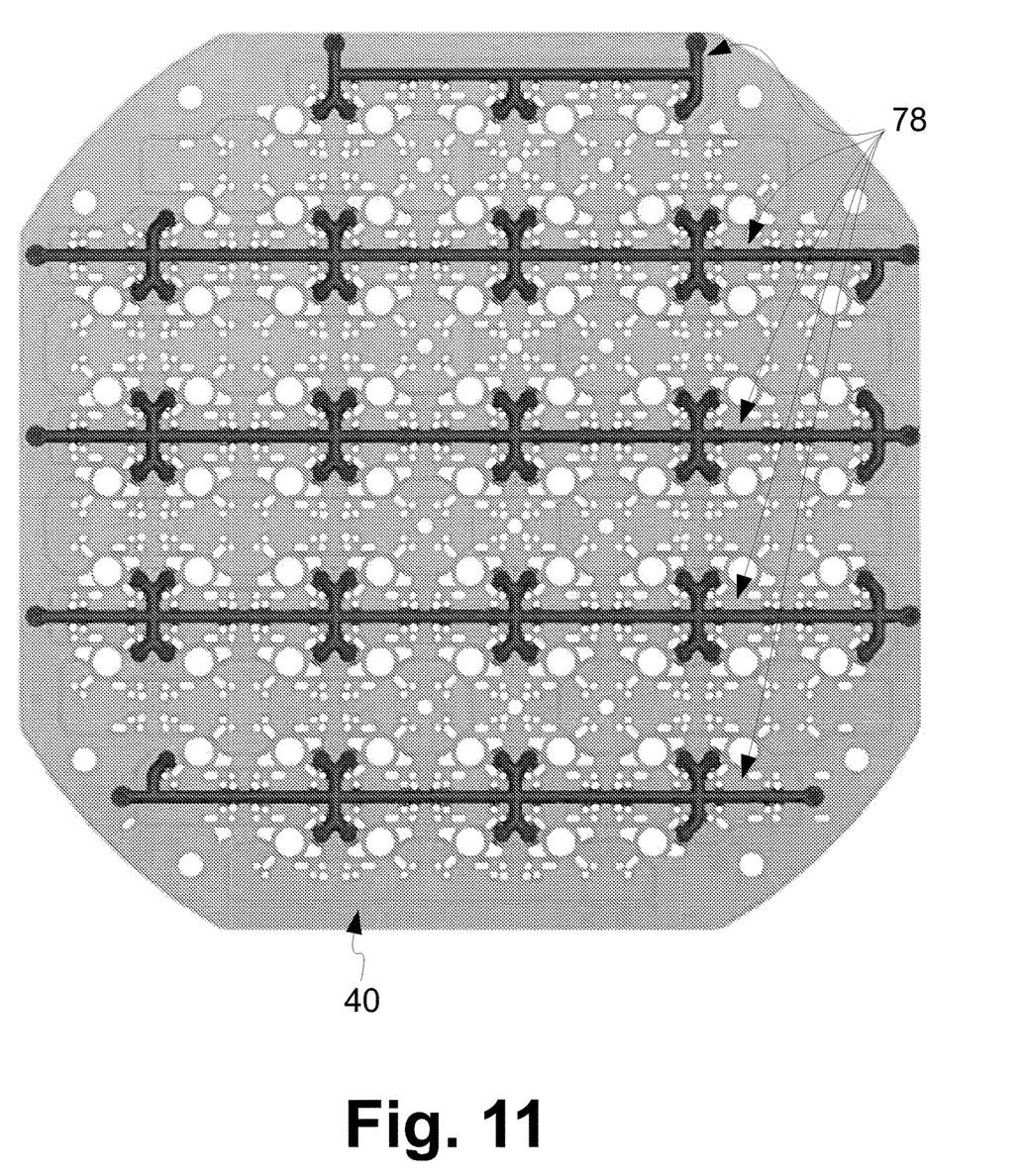
FIG. 11 diagrammatically shows the route of electrical or hydraulic lines within the distribution plate of FIG. 3.

With particular reference to FIG. 11, in the embodiment shown, hydraulic lines 78 run in the receptacles/grooves 42 of the PDP 40 that receive the power cable modules 60, and are overlaid by the installed power cable modules 60. (Note that FIG. 11 is diagrammatic in that it shows the hydraulic lines 78 which are actually mostly or completely occluded by the overlaid installed power cable modules 60). The power cable modules 60 also have openings 65 (labeled in FIGS. 7 and 8) through which hydraulic connections that connect with the hydraulic lines 78 are accessed.

This arrangement of power and signal cable modules 60, 70 allows the disclosed distribution plate to be more modular during construction and servicing. The power cable modules 60 (shown in FIGS. 7 and 8) allow the removal of a failed MI cable or electrical connector (along with those neighboring MI cables and connectors that are part of the same power cable module) while removing only a few CRDMs in the neighborhood of the failed power MI cable. Similar considerations apply to a failed signal MI cable or connector. When the PDP 40 assembly is broken down, all of the MI cables and electrical connectors come out with the cable modules 60, 70, leaving the hydraulic lines 78 and their connectors behind. This exposes the hydraulics to allow for service within the PDP. If only one hydraulic line or connector needs servicing, then only the power cable module overlying that hydraulic line needs to be removed. These features allow for modularity and serviceability of the distribution plate, simplifying manufacturing and servicing, reducing outage times.

The PDP 40 with its installed cable modules 60, 70 is the interface to the CRDMs 20, and supports or houses all electrical cabling and hydraulics, and provides all connector receptacles. This allows a CRDM 20 to be removed and replaced relatively routinely. The interface points could be at any location along the length of the CRDM 20, but placing the interface point (the point at which the CRDM is broken from the upper internals) at the bottom of the CRDM allows the PDP to have a relatively flat face which simplifies installation and removal of the CRDMs. Optionally, a CRDM standoff connects the CRDM and the power distribution plate 40; alternatively, the CRDM can connect directly to the plate.

Enclosing the electrical cabling and hydraulic lines in the PDP 40, as in the illustrative embodiment, provides protection from flow induced vibrations (FIV). It also provides a direct load transfer of the weight of the CRDMs 20 to the mid hanger plate 50 (see FIG. 4). The mid hanger plate 50 also provides structural support for the PDP 40. In other embodiments, the PDP is of sufficient thickness to structurally support the CRDMs directly. In other words, the PDP and the mid-hanger plate are integrated together in these embodiments. In yet other embodiments, the PDP is not associated with the CRDM structural support at all, and provides only power distribution functionality. This is the case, for example, if the PDP is located below the mid-hanger plate, or if the CRDM units are supported from above (i.e. suspended from an upper hanger plate) rather than bottom-supported. As yet another variant, the PDP may be integrated with or connected with an upper hanger plate located above the CRDMs (and the PDP may or may not bear the suspension load of the CRDMs in such embodiments).

The electrical connection of the CRDM 20 to the PDP 40 (with its installed cable modules 60, 70) can be by various techniques. In some embodiments, conventional MI cable junctions and hydraulic connections are employed. In such embodiments, the servicing entails making/breaking MI cable junctions at the reactor, which can be labor-intensive and raises the potential for detrimental water ingress to the mineral insulation of the MI cables. In an alternative approach, "quick connect" connections may be employed, in which the MI cables of the CRDM terminate in male plugs that connect with mating female receptacles of the cable modules 60, 70 (or vice versa), with the weight of the CRDM 20 being sufficient (optionally along with suitable fasteners) to ensure an electrically conductive connection between the male plugs and female mating receptacles. Similarly, "quick connect" hydraulic connections may be employed, in which the hydraulic lines of the CRDM terminate in male nozzles that connect with mating female receptacles of the hydraulic lines 78 (or vice versa), with the weight of the CRDM 20 being sufficient (optionally along with suitable fasteners) to form a (possibly leaky) hydraulic connection. (The working fluid is assumed to be purified primary coolant water, for example from a reactor coolant inventory and purification system, RCIPS). Such "plug-and-play" connection designs are further described in U.S. Ser. No. 13/405,405 filed Feb. 27, 2012 entitled "Control Rod Drive Mechanism (CRDM) Mounting System For Pressurized Water Reactors", first named inventor Scott J. Shargots, which is incorporated herein by reference in its entirety. When plug-and-play connections are employed, in-service replacement of a failed CRDM is further simplified. The CRDM is pulled by removing the hold-down bolts and then lifted from its position. The plug-and-play connectors easily break between the CRDM and the power distribution plate. A new CRDM is then lowered into the vacated position. The connectors again function to connect the new CRDM to the power source and hydraulic supply of the upper internals. Another advantage to the CRDM plug and play method involves the manufacturing flexibility, since the male plugs and female receptacles can be installed at the factory where suitably dry conditions can be maintained to avoid water ingress into the mineral insulation.

With returning reference to FIG. 6, an overhead view is shown of a portion of the PDP 40 with power and signal cable modules 60, 62 installed. The power cable module 60 has electrical power connections 64 and openings 65 (labeled in FIGS. 7 and 8) to accept hydraulic connections 66. The signal cable module 70 has sensor connections 68 for rod position indication and rod bottom indication. Other sensors, such as CRDM temperature or current, may also have connectors (not shown). The sensors may all use identical connectors and one connector may serve multiple sensors, although different types of connectors may also be used to prevent the CRDM from being installed in an incorrect orientation. Alternatively, the connection site of the CRDM may be keyed to prevent improper installation of the CRDM.

FIGS. 7 and 8 show alternative perspective views of one power cable module 60, with FIG. 7 tilted to show the top of the module and FIG. 8 tilted to show the bottom of the module. FIG. 7 shows the top of the module 60 and the electrical power connections 64. The electrical power connection provides power to the CRDM motor and may provide latching power if the latching mechanism is electrical. Openings 65 accept the hydraulic connectors 66 (see FIG. 5) when the module 60 is installed in the receptacle 42 (see FIG. 3) of the PDP 40. The hydraulics provide the latching power if a hydraulic latching mechanism is employed. FIG. 8 shows the bottom of the power cable module 60 with installed power MI cabling 61.

FIGS. 9 and 10 show alternative perspective views of one signal cable module 70, with FIG. 9 tilted to show the top of the module and FIG. 10 tilted to show the bottom of the module. The PI connectors (several of which are labeled 74) connect to the position indicator cables of the CRDMs 20. The signal MI cables 71 are visible in FIG. 10, and connect to the PI connectors 74.

With general reference to FIGS. 7-10, the undersides of the cable modules 60, 70 are constructed so that when the cable modules 60, 70 are installed in the receptacles 42 of the PDP 40 (see FIG. 3), a cable conduit or raceway is defined between the module and the PDP. In the illustrative cable modules 60, 70, this is achieved by having peripheral (i.e. side) standoffs 80, 82 at the periphery of the modules that raise the tops of the modules to define the cable conduit or raceway. The hydraulic lines 78 shown in FIG. 11 are mounted to the PDP 40 inside the receptacles 42 for the power cable modules 60, and the aforementioned conduit or raceway also houses the hydraulic lines 78. The hydraulic lines are attached to the PDP 40 in the illustrative embodiment, but alternatively may be attached to the modules (or omitted entirely if the CRDMs do not employ hydraulic power).

While the disclosed PDP with installable cable modules is described in conjunction with powering CRDM units, it is also suitable for powering internal electrically driven reactor coolant pump (RCP) units. For example, if internal RCP's are disposed on (or in) an annular pump plate in the downcomer annulus, then the PDP could suitably be an annular plate mounted on the pump plate (a two-plate design) or, if thick enough, serving as the pump plate (a one-plate design).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An apparatus comprising:
a nuclear reactor comprising a pressure vessel containing primary coolant water and further containing:
a nuclear reactor core comprising fissile material,
a mounting/electrical distribution plate secured entirely within the pressure vessel and configured to be submerged in the primary coolant,
a set of control rod drive mechanism (CRDM) units mounted directly on the mounting/electrical distribution plate, and
a plurality of cable modules mounted in receptacles of the mounting/electrical distribution plate wherein each cable module includes mineral insulated (MI) cables connected with one or more of the CRDM units, the cable module including its MI cables being removable as a unit from the receptacle of the mounting/electrical distribution plate.

2. The apparatus of claim 1 wherein each CRDM unit includes a plurality of electrical power connectors mating with corresponding electrical power connectors of one or more of the cable modules.

3. The apparatus of claim 1 wherein each CRDM unit includes a plurality of electrical power connectors mating with corresponding electrical power connectors of exactly one of the cable modules.

4. The apparatus of claim 1 wherein:
the mounting/electrical distribution plate has a plurality of openings through which connecting elements pass that connect the CRDM units with control rods comprising neutron absorbing material, the CRDM units being configured to move the control rods into and out of the nuclear reactor core via the connecting elements.

5. The apparatus of claim 1 wherein:
the mounting/electrical distribution plate has a plurality of openings through which the connecting elements pass.

6. The apparatus of claim 1 wherein:
the mounting/electrical distribution plate includes a set of hydraulic lines disposed on or therein that are connected with the electric devices.

7. The apparatus of claim 6 wherein the cable modules mounted in the receptacles of the distribution plate overlay the set of hydraulic lines.

8. The apparatus of claim 7 wherein the cable modules define conduits or raceways through which the set of hydraulic lines run.

9. The apparatus of claim 1 wherein each cable module cooperates with the receptacle of the mounting/electrical distribution plate in which the cable module mounts to define a conduit or raceway through which the MI cables of the cable module run.

10. The apparatus of claim 9 wherein each cable module includes standoffs at the periphery of the cable module to define the conduit or raceway through which the MI cables of the cable module run.

11. A mounting/electrical distribution plate assembly for use in a nuclear reactor including a pressure vessel containing primary coolant water and a set of control rod drive mechanism (CRDM) units, comprising:
a mounting/electrical distribution plate secured entirely within the pressure vessel and submerged in the primary coolant,
a plurality of cable modules mounted in receptacles of the mounting/electrical distribution plate wherein each cable module includes mineral insulated (MI) cables connected with one or more of the CRDM units, the cable module including its MI cables being removable as a unit from the receptacle of the mounting/electrical distribution plate,
wherein the set of control rod drive mechanism (CRDM) units is mounted directly on the mounting/electrical distribution plate.

12. The mounting/electrical distribution plate assembly of claim 11 wherein each CRDM unit includes a plurality of electrical power connectors mating with corresponding electrical power connectors of one or more of the cable modules.

13. The mounting/electrical distribution plate assembly of claim 11 wherein each CRDM unit includes a plurality of electrical power connectors mating with corresponding electrical power connectors of exactly one of the cable modules.

14. The mounting/electrical distribution plate assembly of claim 11 wherein:
the mounting/electrical distribution plate includes a set of hydraulic lines disposed on or therein that are connected with the electric devices.

15. The mounting/electrical distribution plate assembly of claim 14 wherein the cable modules mounted in the receptacles of the distribution plate overlay the set of hydraulic lines.

* * * * *